United States Patent Office 2,899,005
Patented Aug. 11, 1959

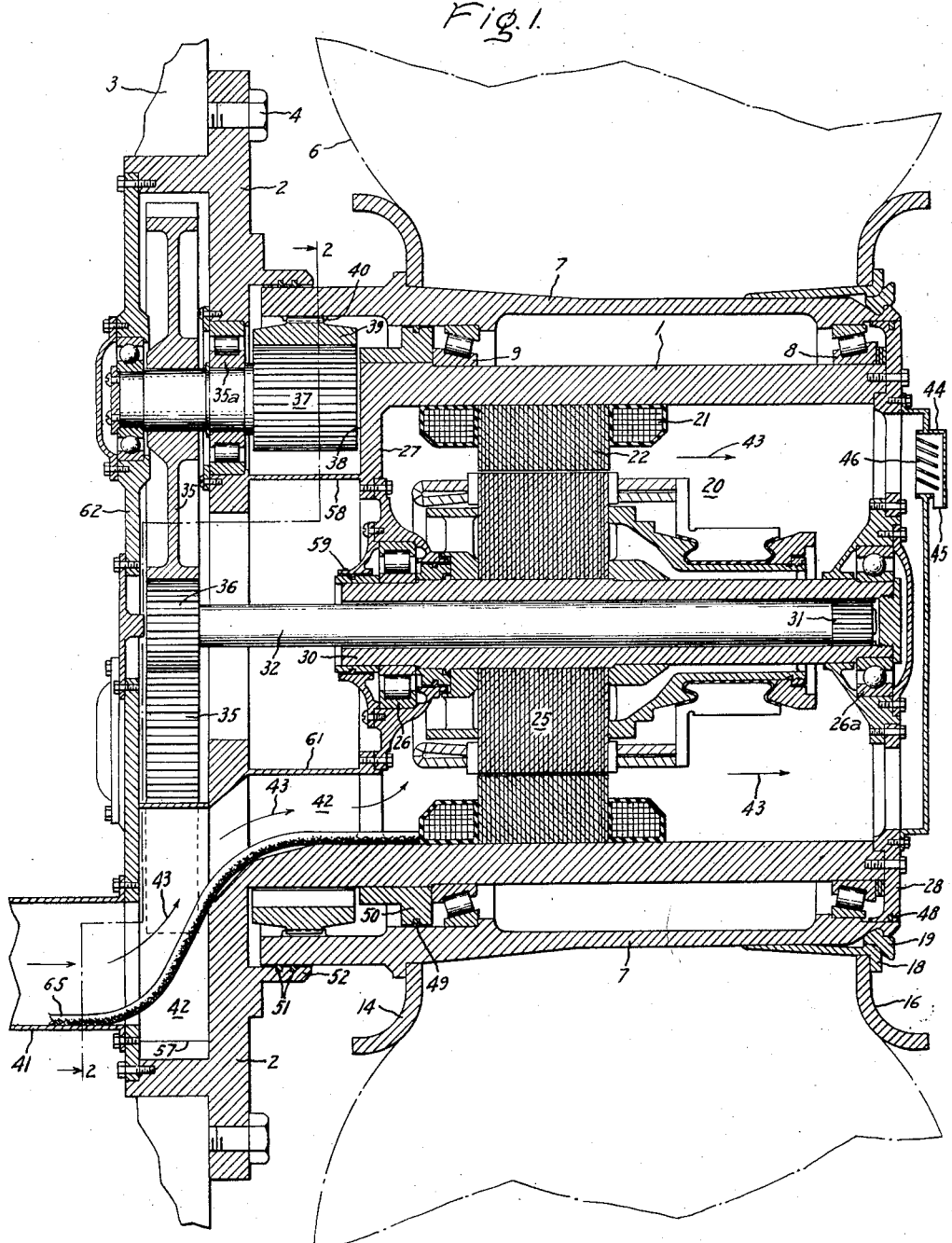

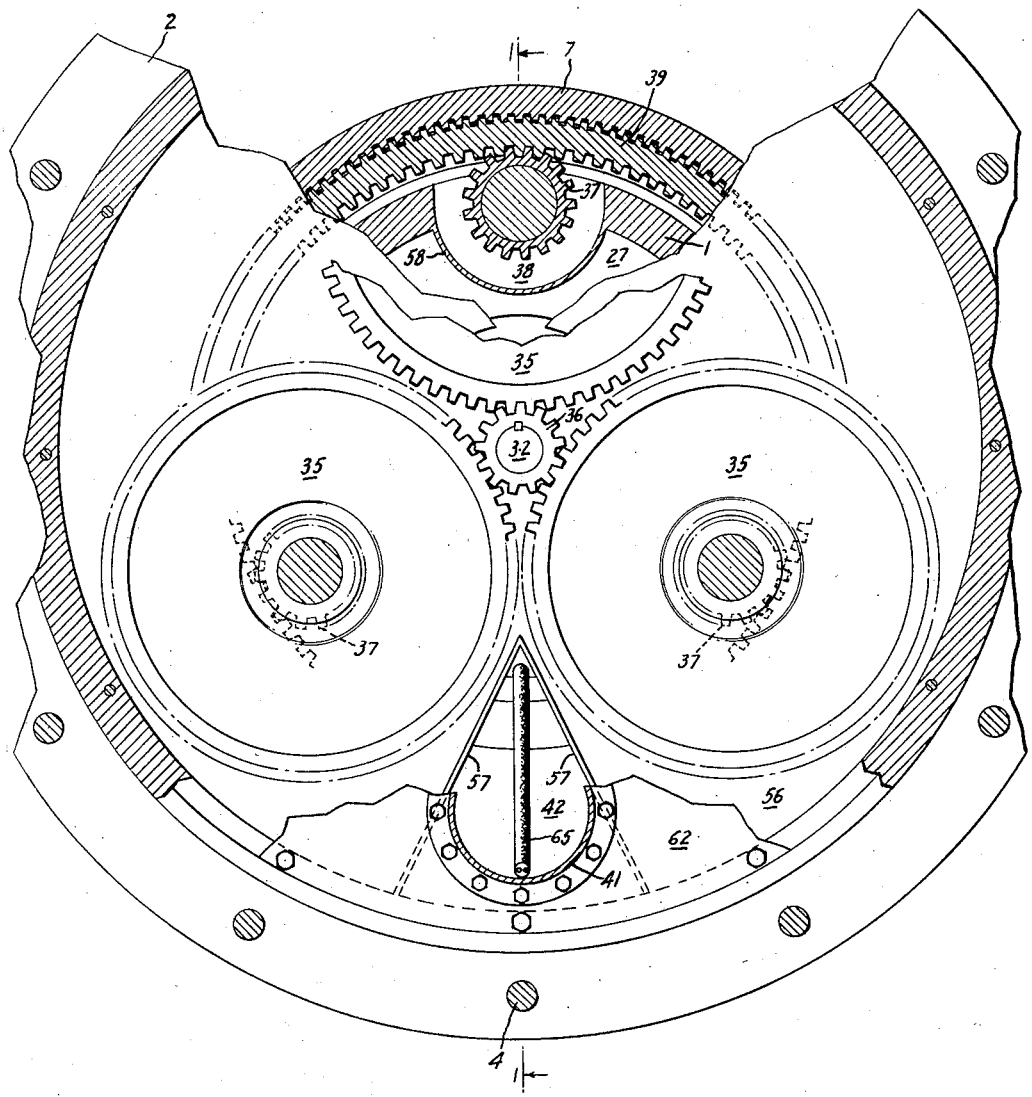

2,899,005

ELECTRIC-POWERED TRACTION WHEEL

William Speicher, North East, Pa., assignor to General Electric Company, a corporation of New York Application July 20, 1955, Serial No. 523,239

3 Claims. (Cl. 180—60)

This invention relates to electric-powered traction wheels, and more particularly to electric-powered traction wheels in which an electric driving motor is built into the axle construction of the wheel.

In large, heavy vehicles of the type used in off-highway service, such as earth moving equipment, the operating economy of the vehicle is largely determined by ratio of the load to the weight of the empty vehicle. Any change in structure which will substantially reduce the weight of the empty vehicle while maintaining its load-carrying capacity will decrease the operating cost of the vehicle, including the wear on the tires. The use of electric motors to drive the traction wheels has the advantage of providing flexible connections between the engine and the traction wheels, so that the powered traction wheels and the body of the vehicle may be tilted or turned with respect to the engine. Electric motor drives also eliminate heavy equipment such as drive shafts and gearing connecting the engine to the traction wheels. Another element which must necessarily be of heavy construction to support the vehicle is the stationary axle of each powered wheel. In electric motors, the heaviest element is generally the flux-carrying frame or stator of the machine.

My invention has for its object the provision of a compact and sturdy electric-powered traction wheel having a minimum weight.

In carrying out my invention in one form, I make a dual purpose use of the heavy hollow cylindrical axle for each wheel, which axle serves also as the outer frame or stator of an electric driving motor for the wheel. Inside of the axle or stator are mounted the pole pieces, field windings and rotor of the motor. The wheel itself consists of a felly provided with a large pneumatic tire, rotatably mounted on the axle and drivably connected by gearing to the rotor of the motor. In order to prevent the transmission of vibrations from the felly to the bearings of the motor, the motor is provided with a hollow shaft with a smaller driving shaft extending through it and having a splined connection within the hollow shaft.

Further objects and advantages of this invention will become apparent and this invention will be better understood by reference to the following description taken in connection with the accompanying drawings. The features of novelty which characterize this invention will be pointed out with particularity in the claims annexed to and forming part of this specification.

Figure 1 shows a sectional side elevation view, taken along the line 1—1 of Figure 2, illustrating the traction motor mounted within the hollow axle of this invention; and Figure 2 shows a sectional view of the gearing taken along the line 2—2 of Figure 1.

Referring to Figure 1, I have shown a hollow cylindrical stationary stub axle member 1 having an integral cast radial plate provided with outwardly extending support flange 2 at one end which is adapted to be secured to the body 3 of a vehicle by some means such as bolts 4. Of course, the flange 2 could be secured to the body of the vehicle by a kingpin or other swivel joint so that the steering wheels of the vehicle could be powered by my invention. The wheel constituted by a pneumatic tire 6 mounted on a felly 7. The felly 7 is mounted on the axle 1 by means of the bearing assemblies 8 and 9, of any conventional and approved type, such as the antifrictional roller bearings as shown, placed between the axle 1 and the felly 7. The tire 6 is confined on the felly 7 between the annular rims 14 and 16, with the rim 16 being held in place by the usual tire-holding means 18 and 19. The axle 1 must have enough cross-sectional area to support the weight which is carried by the powered wheel. With the conventional axle, the shear and bending stresses must be considered. With the hollow axle 1, the radius at the base or point of connection is great enough so that the bending stress is minimized with a short axle as shown. However, the axle 1 must have sufficient strength to prevent shearing under shock loads.

The direct current traction motor 20 is provided with stator windings 21 mounted on the usual laminated pole pieces 22. However, instead of the usual stator core member, the pole pieces 22 are secured directly to the inner surface of the axle 1. Thus, the axle 1 is also the stator 1 of the traction motor 20 providing the magnetic flux path thereof wherein the flux passes between the pole pieces 22 through the wheel axle and traction motor stator 1. I have found that in many applications, the mass of the axle 1, designed to carry the stresses of shock loads, is sufficient to provide a low reluctance path for the stator flux. However, in some applications it will be desirable to reduce the clearance between the axle 1 and the felly 7 to allow some of the flux of the motor to flow in the felly 7. According to my invention, a construction of using the axle and stator 1 as a dual-purpose member considerably reduces the weight of the powered wheels of a vehicle by eliminating any heavy metal construction subject to minimum stress considerations of a bending moment. In other words, no weight carrying metal of the axle stator 1 is wasted in inwardly sloping members to minimize this size of the axle between the points of the support. Obviously, any variations in the radius of the portion of the axle stator 1 would require additional metal for supporting the heavy loads. By comparison, it is obvious that a tin can will resist a bending force much more effectively than a solid rod made of the same materials and having the same mass per unit length. By the use of the word "cylindrical" in connection with the axle and stator 1, I mean a tin can-like structure. Even with this simplified cylindrical construction, a one piece casting (axle and stator 1 and one flange 2) for an off highway vehicle may weigh more than a thousand pounds.

A rotor 25 is mounted on a hollow shaft 30 within the axle and stator 1. In Figure 1, it may be seen that the center lines of the rotor 25, stator 1 and wheel 6, when considered in a direction normal to the rotational axis of the rotor, all lie within planes defined by the spaced antifrictional bearings 8 and 9. The hollow shaft 30 is rotatably supported coaxially within the axle and stator 1 on antifrictional bearings 26 and 26a mounted in the stationary supporting members 27 and 28, which members are secured to the axle and stator 1. In order to prevent vibrations of felly 7 from damaging the bearings 26 or affecting the air gap between the poles 22 and the rotor 25, the shaft 30 is connected by means of keying or splined gearing 31 to an internal quill shaft 32 at the end remote from the three gears 35 meshing with a pinion gear 36. I have found that the use of three gears 35 mounted 120° apart in three antifrictional bearings 35a in the flange 2 will give support to the pinion gear 36 to properly center and support one end of the quill shaft 32 without the use of a direct bearing support. In Figure 2, the quill shaft 32 is shown secured to the pinion gear 36 by a key, but the gear 36 may also be secured permanently by other means or made integral with the quill shaft.

The pinion gear 36 may move a limited amount axially with respect to the gears 35 without affecting the driving engagement, and the quill shaft 32 may vibrate transversely within the hollow shaft 30. The movements and vibrations may result from the vibration of the felly 7. These axial and transverse relative freedoms of movement will prevent the transmission of shock loads from the felly 7 to the rotor bearings 26 and 26a. Thus, the bearings 26 and 26a will carry none of the load of the wheel and may be high-speed antifrictional bearings, with the bearings 8 and 9 carrying the weight of the vehicle.

Each of the three gears 35 is drivingly connected to a reduction gear 37 which projects into a recess 38 in the axle and stator 1 to drive the ring gear 39. It should be noted that the recesses 38 are positioned in the axle and stator 1 at a point remote from the pole pieces 22, and will, of course, have no effect on the magnetic flux path within the stator portion of the traction motor 20. The ring gear 39 is secured to the felly 7 by keying or splined gearing 40. Thus, the torque from the traction motor 20 is drivingly transmitted through speed reduction gearing to the tire 6.

In Fig. 2, I have shown the preferred gearing arrangement wherein the preferred speed ratio of the traction motor 20 to the felly 7 is approximately 27:1. Of course, this ratio may be varied depending on the required tractive effort, the effective diameter of the tire 6 and the torque characteristics of the traction motor 20.

In order that the traction motor 20 may carry heavy current loads without overheating, I prefer that it be cooled by some means such as liquid cooling or forced air convection wherein a conventional blower forces the cooling air into an air duct 41. However, a fan may be driven by the traction motor 20 to draw cooling air in through the duct 41. With either air system, the air will pass through a passage 42 (Fig. 1) to the traction motor as indicated by the arrows 43 through the apertures of the supporting member 28 and out through a vent 44. In order to prevent water entering through the vent 44, I prefer that the vent 44 be placed at the top of the motor 20 and be provided with a downwardly extending nozzle 45 and downwardly sloping louvers 46, however, the nozzle 45 may be omitted and the louvers 46 extended and so formed to prevent water from splashing into the motor.

In order that the powered wheel may travel in several feet of water, which is often necessary in excavation work, the stationary supporting member or end plate 28 is extended to engage the felly 7 with a water-tight seal 48. A similar seal 49 may be mounted on the annular member 50 to form a water-tight seal between the axle and stator 1 and the felly 7. As the axle and stator 1 is provided with recesses 38 to allow the reduction gears 37 to drive the ring gear 39, it is preferred that a double seal 51 be secured on an annular ridge 52 on the flange 2, to form a water-tight seal between the felly 7 and the flange 2.

In order to inhibit the admission of water into the axle and stator 1, even when the exhaust nozzle 45 is submerged, the ventilating air within the motor 20 is maintained at a pressure sufficient to prevent water entering through the vent 44 until the water level is appreciably above the vent 44. In order that water flow into the traction motor 20 through the duct 41 may be prevented, the air intake port (not shown) should be above the top of the motor.

Lubrication for the gears 35 and 36 can be maintained in the lower portion of the casing 56 (Fig. 2) where the gearing will be partially submerged. For the gears 37 and 39, a supply of lubricant can be maintained in the lower portion of the recess 38. In some applications, lubrication may be circulated by a pump (not shown).

However, lubricant should not be present to damage the electrical portions of the traction motor 20. To prevent the gearing lubricant from damaging or fouling the traction motor, the passage 42 is enclosed by the walls 57 in the gear box (Fig. 2), the recess 38 is entirely enclosed on the inside by an annular member 58 and the supporting member 27, and the bearing 26 in the supporting member 27 is provided with a conventional oil seal 59 (Fig. 1). Thus, the elements 27 and 57, the passage wall 61 (Fig. 1), a portion of the flange 2, and a gear box end plate 62 enclose the gearing to form an oil-tight gear casing.

In operation, the power is supplied from a prime mover such as a diesel engine which drives a generator in another portion of the vehicle, through a power line 65, to the traction motor 20, to cause the armature 25 to rotate, driving the hollow shaft 30 and the quill shaft 32. The pinion 36 rotates with the quill shaft 32 to drive the three gears 35, the reduction gears 37, ring gear 39, and felly 7 of the wheel.

With my invention, it is possible to connect these powered wheels to the tractor portion of the vehicle mounted directly thereon or on kingpins of the steering wheels, or to mount the wheels at any convenient location on the semi-trailers or trailers being steered by the tractor. Also with my invention, slipping of one of the wheels because of poor traction can be prevented by reducing the power thereto as shown and described in the United States Letters Patent 2,315,386 issued on March 30, 1943, to Morris J. Baldwin and assigned to the assignee of the present invention.

While I have shown and described a particular embodiment of my invention, further modifications and improvements will occur to those skilled in the art. I desire it understood, therefore, that this invention is not limited to the form shown, and I intend by the appended claims to cover all such modifications which do not depart from the true spirit and scope of this invention.

What I claim as new and desire to secure by Letters Patent of the United States is:

1. The combination with an enlarged cylindrical load-carrying axle made of magnetic material arranged to be secured at one end to the body of a vehicle in a position suitable for supporting a wheel of the vehicle, motor pole pieces and field windings mounted on the inner wall of said cylindrical axle, a motor rotor mounted concentrically within said cylindrical axle for electrodynamic cooperation with said pole pieces, at least a pair of axially spaced antifrictional bearings surrounding the outer surface of said enlarged cylindrical axle, said wheel including a felly rotatably mounted on said bearings, center lines of said rotor, stator and wheel considered in a direction normal to the axes of said rotor, stator and wheel all lying between planes defined by said spaced antifrictional bearings, said bearings having a greater internal diameter than the internal diameter of said enlarged cylindrical axle, and a driving connection between said rotor and said felly.

2. The combination with a motor provided with a rotor rotatably journalled within a non-rotatable hollow cylindrical stator providing the magnetic flux circuit of said motor, said stator including a radially extending portion at one end thereof for securing said one end to the body of a vehicle, at least a pair of axially spaced antifrictional bearings surrounding the outer surface of said stator, a wheel provided with a felly rotatably journalled on said bearings whereby said stator rotatably supports said wheel, the internal diameter of said bearings being greater than the internal diameter of said stator, and reduction gears drivingly connecting said rotor to said felly.

3. An electric-powered traction wheel assembly comprising a hollow cylindrical member of magnetic material having an integral plate partially closing one end, said plate having outwardly extending flange portions for mounting said member to a vehicle for supporting a wheel thereon, at least a pair of axially spaced antifrictional bearings mounted on the outer cylindrical surface of said member, said wheel comprising a felly rotatably mounted on said bearings and a tire supported on said felly, electric traction motor field windings secured on the inner surface of said member, center lines of the said rotor, stator and wheel considered in a direction normal to the axes of said rotor, stator and wheel all lying between planes defined by said spaced antifrictional bearings, said bearings having a greater internal diameter than the internal diameter of said member, a rotor mounted in said member and arranged to cooperate with said windings when energized to provide a torque for driving said felly.

References Cited in the file of this patent

UNITED STATES PATENTS

| | | |
|---|---|---|
| 641,603 | Newman et al. | Jan. 16, 1900 |
| 700,335 | Keiley | May 20, 1902 |
| 715,821 | Ledwinka | Dec. 16, 1902 |
| 1,313,537 | Jones | Aug. 19, 1919 |
| 1,323,245 | Borkes | Dec. 2, 1919 |
| 1,684,168 | Bethel et al. | Sept. 11, 1928 |
| 1,860,703 | Christian | May 31, 1932 |
| 2,258,328 | Lee et al. | Oct. 7, 1941 |
| 2,441,801 | Dever | May 18, 1948 |
| 2,726,726 | Le Tourneau | Dec. 13, 1955 |

FOREIGN PATENTS

| | | |
|---|---|---|
| 118,718 | Australia | July 18, 1944 |
| 109,367 | Great Britain | Sept. 13, 1917 |